United States Patent
Wang et al.

(10) Patent No.: US 9,456,210 B2
(45) Date of Patent: Sep. 27, 2016

(54) SIGN CODING FOR BLOCKS WITH TRANSFORM SKIPPED

(71) Applicant: BLACKBERRY LIMITED, Waterloo (CA)

(72) Inventors: Jing Wang, Waterloo (CA); Dake He, Waterloo (CA); Nan Hu, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 371 days.

(21) Appl. No.: 14/051,989

(22) Filed: Oct. 11, 2013

(65) Prior Publication Data

US 2015/0103918 A1    Apr. 16, 2015

(51) Int. Cl.
*H04N 19/70* (2014.01)
*H04N 19/13* (2014.01)
*H04N 19/159* (2014.01)
*H04N 19/176* (2014.01)

(52) U.S. Cl.
CPC ............ *H04N 19/13* (2014.11); *H04N 19/159* (2014.11); *H04N 19/176* (2014.11)

(58) Field of Classification Search
CPC ............................. H04N 19/159; H04N 19/13
USPC .................................................... 375/240.24
See application file for complete search history.

(56) References Cited

U.S. PATENT DOCUMENTS

2013/0058407 A1    3/2013    Sole Rojals et al.

FOREIGN PATENT DOCUMENTS

| CA | 2677973 | 9/2008 |
|---|---|---|
| CA | 2801767 | 7/2013 |

OTHER PUBLICATIONS

D. Flynn, et al., "Range Extensions Draft 4", JCTVC-N1005.
International Search Report relating to Application No. PCT/CA2014/050976, dated Jan. 8, 2015.

*Primary Examiner* — Andy Rao
*Assistant Examiner* — Nguyen Truong
(74) *Attorney, Agent, or Firm* — Rowand LLP

(57) ABSTRACT

Methods of encoding and decoding sign information for non-zero coefficients in a block of video with transform skipped. The methods include context-based coding of a flag that signals if all signs are the same in the block; using a finite state machine to determine contexts for coding of sign information, some of which may be context-based coded and some of which may be non-context-based coded; context-based coding of sign information wherein the context is based upon the signs of neighbouring coefficients; context-based coding of sign information, where the sign information is a prediction of the sign; and using a dedicated context to code signs with a sign flag indicating whether signs in a transform skipping block have been inverted to preserve a dominant sign bias.

20 Claims, 13 Drawing Sheets

SIGN CODING FOR BLOCKS WITH TRANSFORM SKIPPED

FIELD

The present disclosure generally relates to data compression and, in particular, to methods and devices for video coding in which blocks are coded with the transform skipped, and specifically to methods and devices for coding the sign of non-zero coefficients.

BACKGROUND

The current state-of-the-art for video encoding is the ITU-T H.265/HEVC video coding standard. It defines a number of different profiles for different applications, including the Main profile, Main Still Picture profile and others. There are a number of standards for encoding/decoding images and videos, including H.265, that use block-based coding processes. In these processes, the image or frame is divided into blocks, with sizes typically ranging from 4×4 to 64×64, although non-square blocks may be used in some cases, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction).

When spectrally transforming residual data, many of these standards prescribe the use of a discrete cosine transform (DCT) or some variant thereon. The resulting DCT coefficients are then quantized using a quantizer to produce quantized transform domain coefficients. The blocks of quantized coefficients are then entropy encoded and packaged with side information, like motion vectors and other data, to produce a bitstream of encoded video.

At the decoder, the bitstream is entropy decoded to reconstruct the quantized coefficients. The decoder then inverse quantizes and inverse transforms the reconstructed quantized coefficients to reconstruct the pixel domain residual. Using the same prediction operation as was used at the encoder, the pixel data is then reconstructed.

When encoding quantized coefficients, a number of syntax elements may be used to signal the magnitude of any non-zero coefficients, including significant-coefficient flags, greater-than-one flags, greater-than-two flags, and further level data. A sign bit is also usually encoded and decoded to indicate whether the coefficient is positive or negative. The coding of the sign bit is not context-based since the occurrence of positive and negative signs is usually statistically about equal.

HEVC, and some other video coding schemes, allow for "transform skipping" in some situations. Transform skipping refers to "skipping" the DCT operation and simply quantizing the actual pixel-domain residual data as though it was coefficient data, and then encoding that quantized data. It may also be considered to be application of an identity transform, as opposed to a DCT. In another situation, the transform operation is skipped when lossless coding is used (in which both transform and quantization are skipped). Transform skipping in any of these situations results in data that does not necessarily conform to the assumptions underlying the design of some elements of the encoding process in HEVC.

BRIEF DESCRIPTION OF THE DRAWINGS

Reference will now be made, by way of example, to the accompanying drawings which show example embodiments of the present disclosure, and in which.

Similar reference numerals may have been used in different figures to denote similar components.

DESCRIPTION OF EXAMPLE EMBODIMENTS

Figure 1:
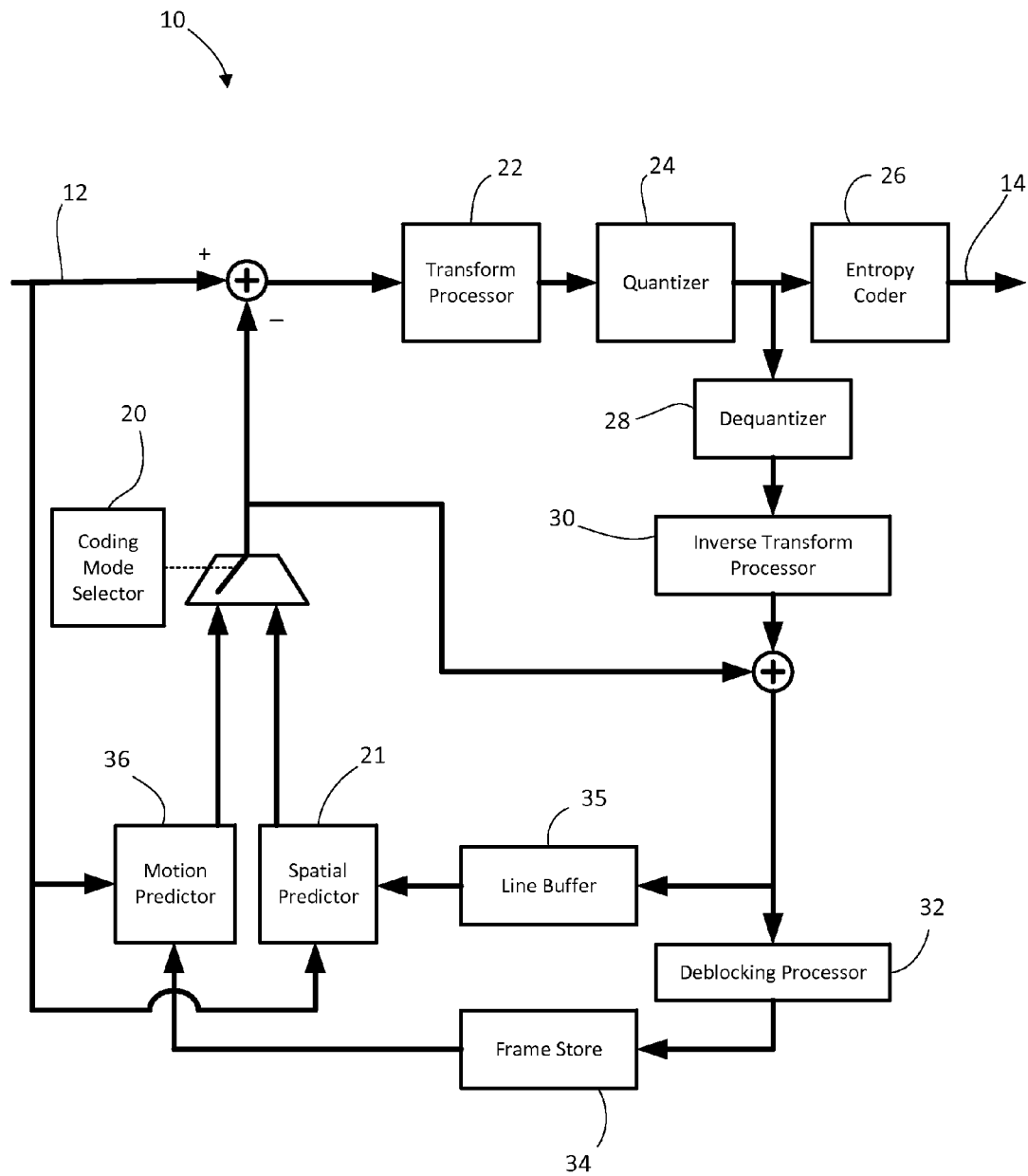
FIG. 1 shows, in block diagram form, an encoder for encoding video.

The present disclosure describes methods and encoders/decoders for coding the signs of non-zero coefficients in a block with transform skipped.

In a first aspect, the present disclosure describes a method of decoding a bitstream of data in a video decoder to reconstruct non-zero coefficients of a block in a video. The method includes determining that the block was encoded with transform skipped and, based on that determination, decoding a same-sign flag that indicates whether the non-zero coefficients in the block all have the same sign. If the non-zero coefficients all have a common sign, then decoding a syntax element that indicates whether the common sign is positive or negative, and reconstructing the signed values of the non-zero coefficients based on the syntax element; and otherwise, then reconstructing sign bits for the respective non-zero coefficients of the block, and reconstructing the signed value of each non-zero coefficient based on its respective sign bit.

In another aspect, the present application describes a method of encoding a block of video in a video encoder, the block having one or more non-zero coefficients. The method includes determining that the block is to be encoded with transform skipped and, based on that determination, encoding a same-sign flag that indicates whether the non-zero coefficients in the block all have a common sign; if the non-zero coefficients all have the common sign, then encoding a syntax element that indicates whether the common sign is positive or negative; and if the non-zero coefficients do not all have the common sign, then, for each of the non-zero coefficients, encoding a sign bit if its sign bit cannot be inferred.

In yet another aspect, the present application describes a method of decoding a bitstream of data in a video decoder to reconstruct non-zero coefficients of a block in a video. The method includes determining that the block was encoded with transform skipping and, based on that determination, for each non-zero coefficient in the block in a scan order, decoding sign information for that non-zero coefficient; and setting that non-zero coefficient to positive or negative based on that sign information. The decoding is non-context-based decoding of sign information for at least one non-zero coefficient and context-based decoding of sign information for at least one other non-zero coefficient.

In another aspect, the present application describes a method of encoding a block of video in a video encoder, the block of video having two or more non-zero coefficients. The method includes determining that the block is to be encoded with transform skipping and, based on that determination, for each non-zero coefficient in the block in a scan order, encoding sign information for that non-zero coefficient, wherein the sign information is based on whether that non-zero coefficient is positive or negative, and wherein the encoding is non-context-based encoding of sign information for at least one non-zero coefficient and context-based encoding of sign information for at least one other non-zero coefficient.

In a further aspect, the present disclosure describes encoders and decoders configured to implement such methods of encoding and decoding.

In yet a further aspect, the present disclosure describes non-transitory computer-readable media storing computer-executable program instructions which, when executed, configured a processor to perform the described methods of encoding and/or decoding.

Other aspects and features of the present disclosure will be understood by those of ordinary skill in the art from a review of the following description of examples in conjunction with the accompanying figures.

In the description that follows, some example embodiments are described with reference to the H.264 standard for video coding and/or the developing H.265/HEVC standard. Those ordinarily skilled in the art will understand that the present disclosure is not limited to H.264/AVC or H.265/HEVC but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. The term "frame" may be replaced with "picture" in H.265/HEVC. A series of frames/pictures may be called a "sequence" in some cases. Other terms may be used in other video coding standards. It will also be appreciated that certain encoding/decoding operations might be performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to coding tree units, coding units, prediction units, transform units, etc., as will become apparent in light of the description below.

Figure 2:
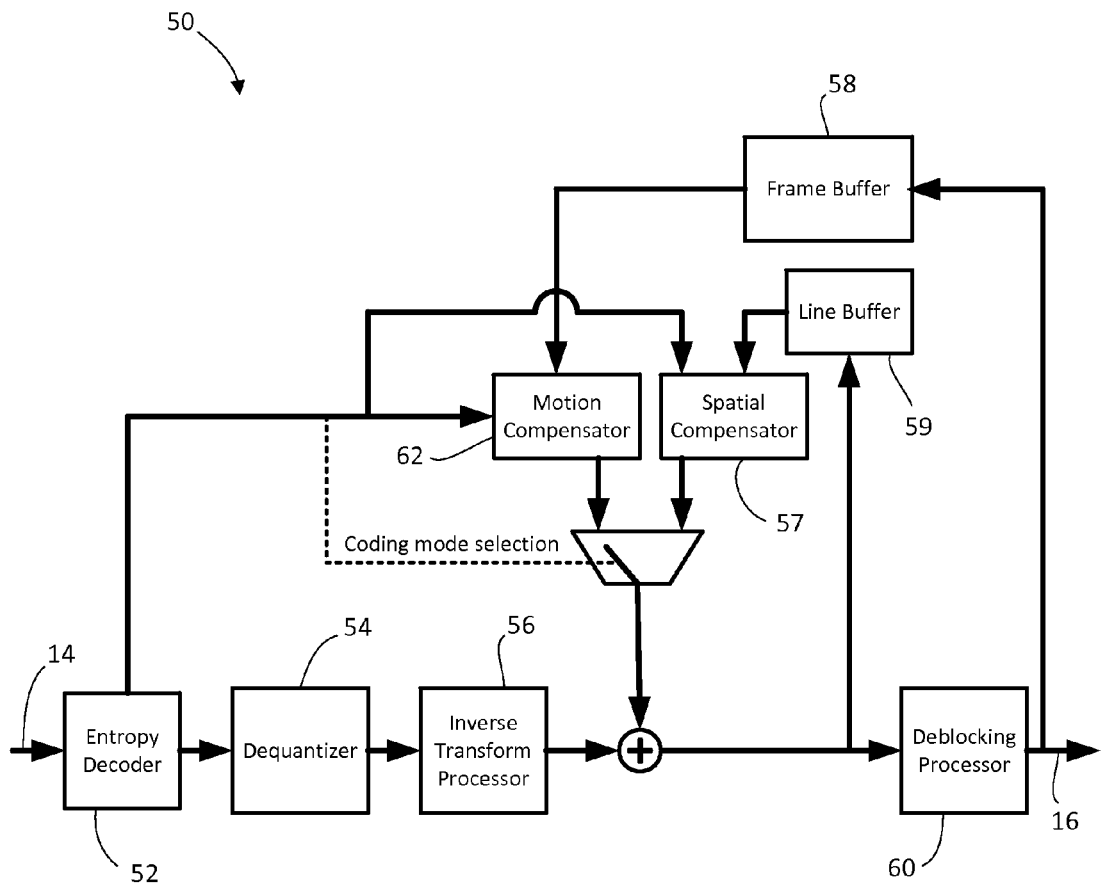
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like H.265/HEVC.

The encoder 10 includes a spatial predictor 21, a coding mode selector 20, a motion predictor 36, a transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, etc.) within the frame/slice are inter or intra coded, i.e. whether the prediction comes from the motion predictor 36 (inter coded) or the spatial predictor 21 (intra coded). The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform, a wavelet transform, or others may be used in some instances. The block-based transform is performed on a transform unit. The transform unit may be the size of the coding unit, or the coding unit may be divided into multiple transform units. In the H.264 standard, for example, a typical 16×16 macroblock (coding unit) contains sixteen 4×4 transform units and the DCT process is performed on the 4×4 blocks. Transform unit (TU) may be other sizes. In some cases, the TU may be non-square, e.g. a non-square quadrature transform (NSQT).

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction operation, the encoder 10 creates a predicted block or unit based on the data of nearby pixels. There are various modes or directions for prediction. In some cases rate-distortion optimization may be used to select a mode/direction. The nearby pixels used in the prediction operation are reconstructed pixels that have been previously encoded and decoded and stored in a line buffer 35 within the feedback loop. The difference between the actual pixel data for the block and the predicted block is a residual block, i.e. an error signal. The residual data is transformed, quantized and encoded for transmission in the bitstream 14.

Inter-coded frames/blocks rely upon temporal prediction, i.e. they are predicted using reconstructed data from other frames/pictures. The encoder 10 has a feedback loop that includes a de-quantizer 28, inverse transform processor 30, and deblocking processor 32. The deblocking processor 32 may include a deblocking processor and a filtering processor. These elements minor the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. The motion predictor 36 uses the frames/slices stored in the frame store 34 as source frames/slices for comparison to a current frame for the purpose of identifying similar blocks. In other words, a motion vector search is carried out to identify a block within another frame/picture. That block is the source of the predicted block or unit. The difference between the predicted block and the original block becomes the residual data that is then transformed, quantized and encoded.

Those ordinarily skilled in the art will appreciate the details and possible variations for implementing video encoders.

The decoder 50 includes an entropy decoder 52, dequantizer 54, inverse transform processor 56, and deblocking processor 60. The deblocking processor 60 may include deblocking and filtering processors. A line buffer 59 stores reconstructed pixel data while a frame/picture is being decoded for use by a spatial compensator 57 in intra-coding.

A frame buffer 58 stores fully-reconstructed and deblocked frames for use by a motion compensator 62 in applying motion compensation.

The bitstream 14 is received and decoded by the entropy decoder 52 to recover the quantized coefficients. Side information may also be recovered during the entropy decoding process, including coding mode information, some of which may be supplied to the feedback loop for use in creating the predictions. For example, the entropy decoder 52 may recover motion vectors and/or reference frame information for inter-coded blocks, or intra-coding mode direction information for the intra-coded blocks.

The quantized coefficients are then dequantized by the dequantizer 54 to produce the transform domain coefficients, which are then subjected to an inverse transform by the inverse transform processor 56 to recreate/reconstruct the residual pixel-domain data. The spatial compensator 57 generates a predicted block from prediction direction information decoded from the bitstream and the previously-reconstructed nearby pixels in line buffer 59. The spatial prediction applies the same prediction mode/direction as was used by the encoder in reliance upon previously-reconstructed pixel data from the same frame. Inter-coded blocks are reconstructed by creating the predicted block based on a previously-decoded frame/picture and the motion vector decoded from the bitstream. The reconstructed residual data is then added to the predicted block to generate the reconstructed pixel data. Both spatial and motion compensation may be referred to herein as "prediction operations".

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

In many video coding standards, the coefficient data is encoded through encoding a number of syntax elements. As an example, in HEVC/H.265, a quantized coefficient may be coded using a significant coefficient flag to indicate whether the coefficient is non-zero, a greater-than-one flag to indicate whether the magnitude of the non-zero coefficient is greater than one, a greater-than-two flag to indicate whether the magnitude of the non-zero coefficient is greater than two, and a remaining level integer that specifies the magnitude of the non-zero coefficient if the flags indicate it is greater than two (or greater than one in some cases where the greater-than-two flag is no longer used). In addition to coding the magnitude of the coefficient using these various syntax elements, the sign of the coefficient is encoded.

HEVC/H.265 proposes, in general, that a sign bit for each coefficient is encoded and decoded. In many embodiments, each coefficient has a corresponding sign bit, which may be set to zero if the coefficient is positive, and set to 1 if the coefficient is negative. The sign bits are encoded and decoded using non-context-based encoding (i.e. using equal probability coding, sometimes termed "bypass coding" or clear coding). In some cases, a sign bit may be inferred, such as through sign-data hiding, as described in US patent publication 2013/0188725, published Jul. 25, 2013, and owned in common herewith. The contents of US patent publication 2013/0188725 are hereby incorporated by reference.

Another feature of HEVC/H.265 is transform skipping. In some circumstances, the encoder may determine that it would be advantageous to skip the transform operation and simply quantize the residual data directly in the spatial domain. The quantized residual data is then treated as the coefficient data and is encoded in the normal course. A transform skipping flag may be used to signal when transform skipping is active for a block.

Video codecs such as AVC/H.264 and HEVC/H.265 provide lossless coding modes that permit the bypassing of the transform, quantization, and deblocking operations and their respective inverse operations where appropriate. An encoder may determine, either by way of operator instruction, or by an internal decision process, to invoke such a mode and to encode the unquantized residual data directly in the spatial domain. The unquantized residual data is then treated as the coefficient data and is encoded in the normal course. Multiple methods exist to signal this mode such as configuring the codec to treat the use of a per block quantization parameter of zero as enabling this behaviour, or alternatively by using a flag to signal that the behaviour is active for a block.

The effect of a skipped transform, depending upon picture content, is similar for both the transform skipping mode and the transform-quantization bypass lossless mode. In the description herein, the phrases "with transform skipped", "transform skipping" or "a skipped transform" are used interchangeably and are meant to indicate a method in which the transform operation has been skipped or bypassed, resulting in spatial domain coding.

The present inventors have found that the assumptions underlying the sign bit coding process do not necessarily hold in the case of transform skipping. In particular, the present inventors have found that, although the probability of a particular sign bit is generally 50/50 over a long sequence, there is much greater degree of bias in individual blocks. In a normal transform block, the sign bits are bypass coded, in part because there is no dominant sign so context-adaptive coding would not be expected to result in improved compression. However, in transform skipped blocks, one of the signs tends to be dominant. The following table provides the probability of the dominant sign in a transform skipping block for several standard text sequences coded at different QPs using the HEVC reference software:

TABLE 1

| | QP | | | |
|---|---|---|---|---|
| Sequences | 22 | 27 | 32 | 37 |
| BasketballDrillText | 0.74 | 0.78 | 0.76 | 0.84 |
| SlideEditing | 0.78 | 0.80 | 0.82 | 0.85 |
| SlideShow | 0.80 | 0.82 | 0.84 | 0.87 |
| ChinaSpeed | 0.78 | 0.80 | 0.83 | 0.86 |

Notably, there is a strong bias within an individual transform block. In other words, for an individual transform block, there is a strong likelihood that most of the non-zero coefficients will have the same sign.

In order to improve compression efficiency, it may be advantageous to change the coding process for sign bits in the case of blocks with transform skipped. In some embodiments, this may result in coding a video sequence using fewer bits, which may result in savings in terms of bandwidth and/or memory usage.

Various sign coding processes for transform skipping blocks are described below. In some cases, one or more of the processes may be used in combination.

Same Sign Flag

In one aspect, the sign coding process may include adding a syntax element to signal the special case where all non-zero coefficients in a transform block have a common sign, i.e. the sign of each of the non-zero coefficients is the same. In this description, the syntax element is labelled a same-sign flag. If all coefficients have the same sign, then only one sign bit or sign flag needs to be sent for the block to indicate whether the signs of the non-zero coefficients are all positive or negative. The sign flag for signaling whether the common sign is positive or negative may be a separate syntax element from the normal sign bits or, instead of using a separate syntax element, the encoder may encode the first sign bit for the first non-zero coefficient in the scan order and forego sending any other sign bits for the other non-zero coefficients. In some cases, the sign flag may be inferred such as through sign-data hiding.

Figure 3:
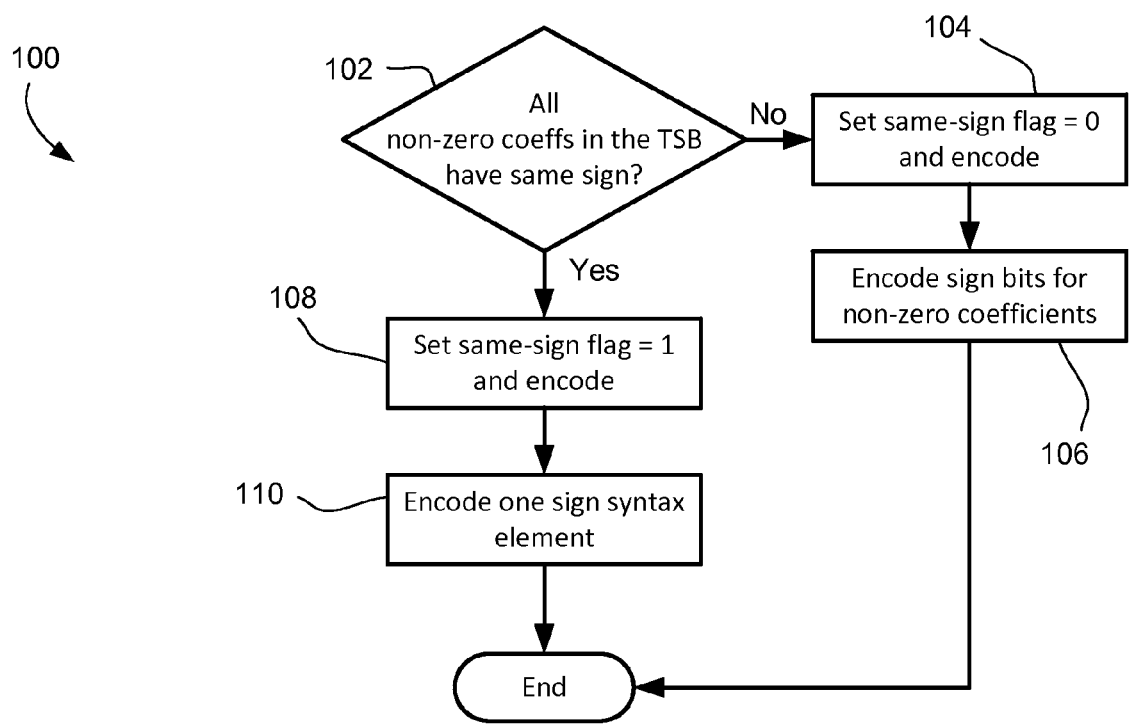
FIG. 3 shows, in flowchart form, an example method for encoding sign bits for a block with transform skipped.

Reference is now made to FIG. 3, which shows, in flowchart form, an example method 100 for encoding sign information in a video encoder when transform skipping is used. The illustrated method 100 features only the operations directly relevant to sign encoding and does not detail all of the related operations in encoding video, including prediction operations, quantization, or the coding of significant-coefficient data and level information.

The method 100 is applied in the case of blocks with transform skipped. It will be appreciated that a video encoder incorporating the method 100 may encode blocks of video without applying the method 100 in cases where transform skipping is not being used. It will be appreciated there may be additional conditions or tests for determining when to apply the method to a particular block of video data.

The method 100 begins operating 102, in which the encoder determines whether all non-zero coefficients in the block have a common sign. If not, then the syntax element same-sign flag is set to zero and is encoded in operation 104. The same-sign flag may be encoded using context-based encoding. In one embodiment, a dedicated context is used for the encoding of same-sign flag. The individual sign flags of the non-zero coefficients in the block are then encoded, as per usual, in operation 106.

In the event that all non-zero coefficients have a common sign, then in operation 108 the same-sign flag is set to 1 and is encoded. The encoder then encodes one sign syntax element to signal whether all the signs are positive or negative, as indicated by operation 110. In one embodiment, there is a separate syntax element, coeff-block-sign flag, that is encoded to signal this information. That element may be encoded using context-based coding using its own dedicated context. In this embodiment, none of the sign bits of the non-zero coefficients are encoded. In another embodiment, the sign bit of one of the non-zero coefficients (e.g. the first coefficient in scan order) may be encoded in the normal manner, and the sign bits of the remaining non-zero coefficients are not encoded.

Figure 4:
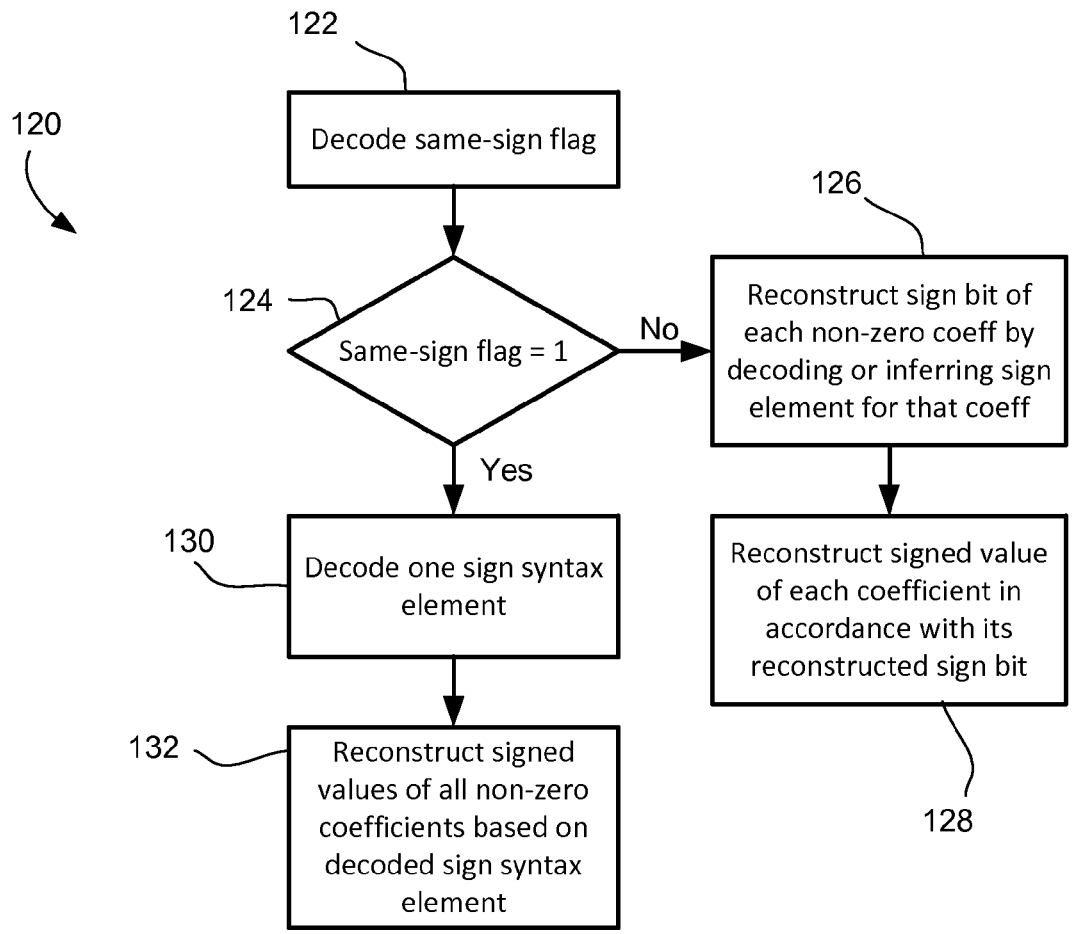
FIG. 4 shows, in flowchart form, an example method for decoding sign bits for a block with transform skipped.

An example decoding method 120 is shown, in flowchart form, in FIG. 4. As noted in connection with the method 100, the method 120 is applied in the case of transform skipping. When the decoder determines that transform skipping has been applied with respect to a particular block, the decoder may use the method 120 when decoding sign information for the non-zero coefficients in the block.

The method 120 begins with operation 122, in which the decoder decodes the same-sign flag for the block. The decoding may include context-adaptive decoding in some embodiments. Once the same-sign flag is decoded, the decoder assesses whether the flag is 1 or 0, as indicated by operation 124. If the flag is zero, then all the signs are not the same. Accordingly, in operation 126 the decoder reconstructs the sign bit of each of the non-zero coefficients in the block. The reconstruction of sign bits may include decoding a sign bit from the bitstream. In some instances, such as with sign-data hiding, the reconstruction of sign bits may include inferring the value of one or more sign bits. In operation 128, the decoder uses the reconstructed sign bits to reconstruct the signed value of each non-zero coefficient in accordance with its associated reconstructed sign bit.

Reconstructing the signed value of a coefficient means generating the reconstructed signed integer that represents the signed value of that coefficient. The magnitude of the coefficient may have been reconstructed by the encoder through decoding of significant-coefficient flags and other level syntax elements, such as greater-than-one flags, level integers, etc. Reconstructing the signed value may mean changing the sign of any reconstructed magnitude to negative (or positive), if its reconstructed sign bit indicates that such a change is needed. For example, level reconstruction of the magnitude of the coefficients may, by default, result in positive coefficients. Accordingly, the sign bits indicate which of the non-zero coefficients need to be made negative. In other implementations, an operation may be applied to every magnitude value, such as effectively multiplying by +1 or −1 depending on the associated reconstructed sign bit. In some cases, the values are represented in two's complement. In other cases, different binary or other numeric representations may be used, depending on the nature of the implementation. All such cases are intended to be captured within meaning of the language "reconstructing the signed value of a coefficient".

If the decoded same-sign flag is set to 1, i.e. if it indicates to the decoder that all sign bits in the block have a common sign, then in operation 130 the decoder decodes a sign syntax element. As noted above, this syntax element may be an element dedicated to signaling the sign in a same-sign situation, or it may simply be the sign bit of one of the non-zero coefficients, depending on the implementation. In the case of a dedicated syntax element, the decoding may be context-adaptive decoding, in some embodiments. In the case of a normal sign bit, the decoding may be non-context-based decoding.

Once the syntax element has been decoded, then in operation 132 the decoder reconstructs the signed value of each non-zero coefficient based on the decoded sign syntax element. As mentioned above, the reconstructing of signed values may, in some implementations, mean changing the sign of any coefficients that do not have the correct sign indicated by the sign syntax element and not changing the sign of any coefficients that already have the correct sign indicated by the sign syntax element.

It should also be noted that when not all signs are the same, i.e. when the individual sign bits are encoded, a special case may arise that permits a sign bit to be inferred. If all but one of the sign bits has been decoded and all of the decoded sign bits are the same sign, then it can be inferred that the last sign bit has the opposite sign. Accordingly, under that condition the encoder and decoder may infer the last sign bit without explicitly coding it. Sign-data hiding may also be applied in other situations, as will be described further below.

In one non-limiting example, and without restricting the present disclosure to H.265/HEVC or variants thereof, the following pseudo-code syntax illustrates one implementation of an aspect of the present disclosure through changes to the current draft edition H.265/HEVC syntax.

The syntax for residual decoding may be modified as to include the following pseudo-code:

|  | Descriptor |
|---|---|
| residual_coding( x0, y0, log2TrafoSize, cIdx ) { | |
|    if( transform_skip_enabled_flag && !cu_transquant_bypass_flag && | |
|      ( log2TrafoSize <= Log2MaxTransformSkipSize ) ) | |
|      transform_skip_flag[ x0 ][ y0 ][ cIdx ] | ae(v) |
|    ... | |
|    if( transform_skip_flag[ x0 ][ y0 ][ cIdx ] ) { | |
|      same_sign_flag | ae(v) |
|      if( same_sign_flag ) | |
|         coeff_blk_sign_flag | ae(v) |
|    } | |
|    noInferSignFlag = 0 | |
|    for( n = 15; n >= 0; n− − ) { | |
|      xC = ( xS << 2 ) + ScanOrder[ 2 ][ scanIdx ][ n ][ 0 ] | |
|      yC = ( yS << 2 ) + ScanOrder[ 2 ][ scanIdx ][ n ][ 1 ] | |
|      if( sig_coeff_flag[ xC ][ yC ] && | |
|         ( !sign_data_hiding_enabled_flag | | !signHidden | | ( n != firstSigScanPos ) ) ) | |
|         if( !transform_skip_flag[ x0 ][ y0 ][ cIdx ] | | ( !same_sign_flag && noInferSignFlag ) ) { | |
|            coeff_sign_flag[ n ] | ae(v) |
|            if( n != lastSigScanPos ) | |
|               noInferSignFlag |= coeff_sign_flag[ n ] ^ prevCoeffSignFlag | |
|            prevCoeffSignFlag = coeff_sign_flag[ n ] | |
|         } | |
|    } | |
|    ... | |
|    if( !same_sign_flag ) | |
|      TransCoeffLevel[ x0 ][ y0 ][ cIdx ][ xC ][ yC ] = | |
|         ( coeff_abs_level_remaining[ n ] + baseLevel ) * ( 1 − 2 * coeff_sign_flag[ n ] ) | |

| | Descriptor |
|---|---|
| Else<br>    TransCoeffLevel[ x0 ][ y0 ][ cIdx ][ xC ][ yC ] =<br>        ( coeff_abs_level_remaining[ n ] + baseLevel ) * ( 1 − 2 * coeff_blk_sign_flag<br>)<br>...<br>} | |

In the above example psuedocode, the sign information is signaled using the element coeff_blk_sgn_flag in the case where all the signs in the block are the same.

It will be appreciated that in some embodiments, the same-sign flag may be used in conjunction with sign-data hiding. In one example, the same-sign flag may be used to signal the special case where all non-zero coefficients in a block with transform skipped, except for the coefficients whose signs are inferred through sign-data hiding, have a common sign. If all such coefficients have a common sign, then only one sign syntax element or sign bit needs to be sent for the block to indicate whether the sign of all such non-zero coefficients is positive or negative.

In another example, the same-sign flag may be used to signal the special case where all non-zero coefficients in a transform skipping block have a common sign. If all coefficients have the same sign, then only one sign syntax element or sign bit needs to be sent for the block to indicate whether the sign of all non-zero coefficients is positive or negative. The sign syntax element or sign bit itself may be inferred through sign-data hiding. Or it may be sent explicitly, in which case sign-data hiding is disabled for such blocks.

In yet another example, the same-sign flag may be used to signal the special case where all non-zero coefficients in a transform skipping block have a common sign. If all coefficients have the same sign, then only one sign syntax element or sign bit needs to be determined or inferred (through sign-data hiding for example) for the block to indicate whether the sign of all the non-zero coefficients is positive or negative. Otherwise, a second syntax element is added to signal the special case where all non-zero coefficients in a transform skipping block, except for the coefficient whose sign is inferred through sign-data hiding, have a common sign. If all such coefficients have the same sign, then the sign of all such non-zero coefficients may be inferred as the opposite of that of the coefficient whose sign is inferred through sign-data hiding.

In some embodiments, a threshold may be used to determine whether the same-sign flag is signaled for a certain block of coefficients or not. In one example, the threshold is based on the number of non-zero coefficients in the block. That is, there must be at least a threshold number of non-zero coefficients in the block, excluding the non-zero coefficients whose signs are inferred through sign-data hiding. In some embodiments, the threshold may be set to 2. When the same-sign flag is not signalled in the bitstream, it may be inferred. For example, if the number of non-zero coefficients in the block is exactly 1, the same-sign flag may be inferred to be set or 1. In another example, if the number of non-zero coefficients in the block is greater than 1 but less than the threshold, the same-sign flag may be inferred to be 0. Note that when the same-sign flag is inferred and the number of non-zero coefficients in the block is greater than 1, further inference of the last sign bit in the case where all of the decoded sign bits before the last sign bit are the same sign should be disabled.

A transform skipping block may contain multiple sub-blocks. Each of these sub-blocks may be regarded as a transform skipping block in the examples described above, and may have its own same-sign flag and related syntax elements. In these cases, the same-sign flag may then be used in conjunction with sign-data hiding at the sub-block level, and a threshold may be used to determine whether the same-sign flag is signaled for a sub-block of coefficients or not.

In an example where a transform skipping block consists of multiple sub-blocks and each sub-block has its own same-sign flag, the coding of the same-sign flag of a sub-block may depend upon the same-sign flags of the previously-coded sub-blocks in the same transform skipping block. Examples of such dependence include, but are not limited to, 1) the coding mode, i.e. whether to use context-based coding or not; 2) the context used in context-based coding, i.e. the context might depend on previously decoded same-sign flags in the same transform skipping block; 3) a prediction of the current same-sign flag determined from the previously-decoded same-sign flags; 4) an inference of the current same-sign flag from the previously-decoded same-sign flags; 5) adjusting the threshold used to determine whether the current same-sign flag is coded according to previously-decoded same-sign flags; or 6) any logical combination of the examples above.

Finite State Machine

In another aspect, the fact that there is a high probability that all coefficients in a transform skipping block have the same sign may be exploited to improve the context-based encoding of sign syntax elements (sign bits themselves, or other sign information elements). In particular, it has been noted that if a sequence of coded non-zero coefficients in a transform skipping block have a common sign, it is highly probably that the next non-zero coefficient has the same sign. The longer the sequence of consecutive common sign coefficients, the higher the probability that the next coefficient has the same sign. Conversely, if two coefficients with opposite signs are encountered in the sequence, then the signs of subsequent coefficients tend to be random, i.e. the probability is about 0.5 of either sign appearing. These observations may be used to build a finite state machine context model.

Figure 5A:
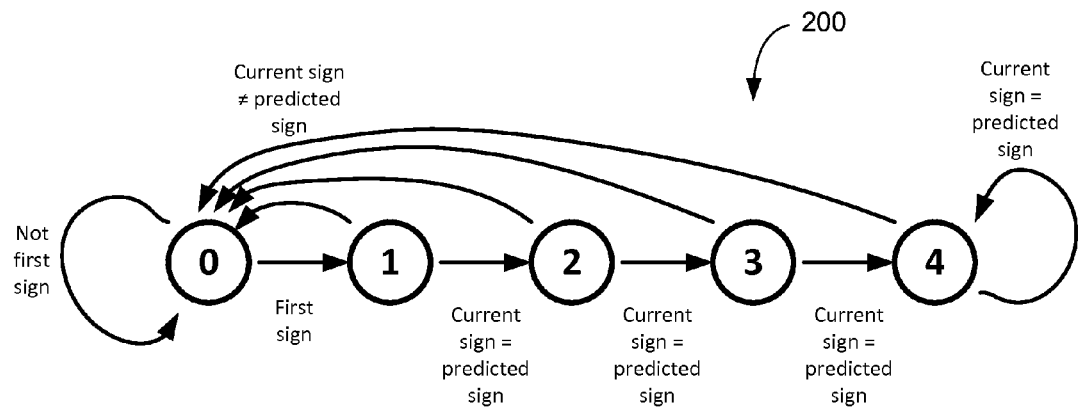
FIG. 5a shows a finite state machine for determining context for coding sign flags of a block with transform skipped.

An example finite state machine 200 is diagrammatically illustrated in FIG. 5a. The finite state machine 200 has an initial state 0 that corresponds to non-context-based EP coding. After the first sign in a transform skipping block is coded, then the finite state machine progresses to state 1. After this point, the transitions will be based on whether the sequence maintains the same sign. If the same sign continues to be encountered in the sequence of non-zero coefficients in the block, then the machine progresses to states 2, 3, and 4, in turn. Each state may correspond to a different context. For example, contexts 0-3 may be used and may be selected based on the state index minus 1, e.g. state 2 corresponds to context 1. In this example machine 200, state 4 is a maximum state. Other embodiments may have more or fewer states.

In the event that a sign bit is encountered that does not match the previous sign bits in the sequence, then that sign bit is encoded using the context of the current state and the finite state machine 200 then transitions back to state 0 where it remains for the duration of the sequence. All subsequent sign bits are encoded using EP coding, i.e. non-context-based coding.

Figure 5B:
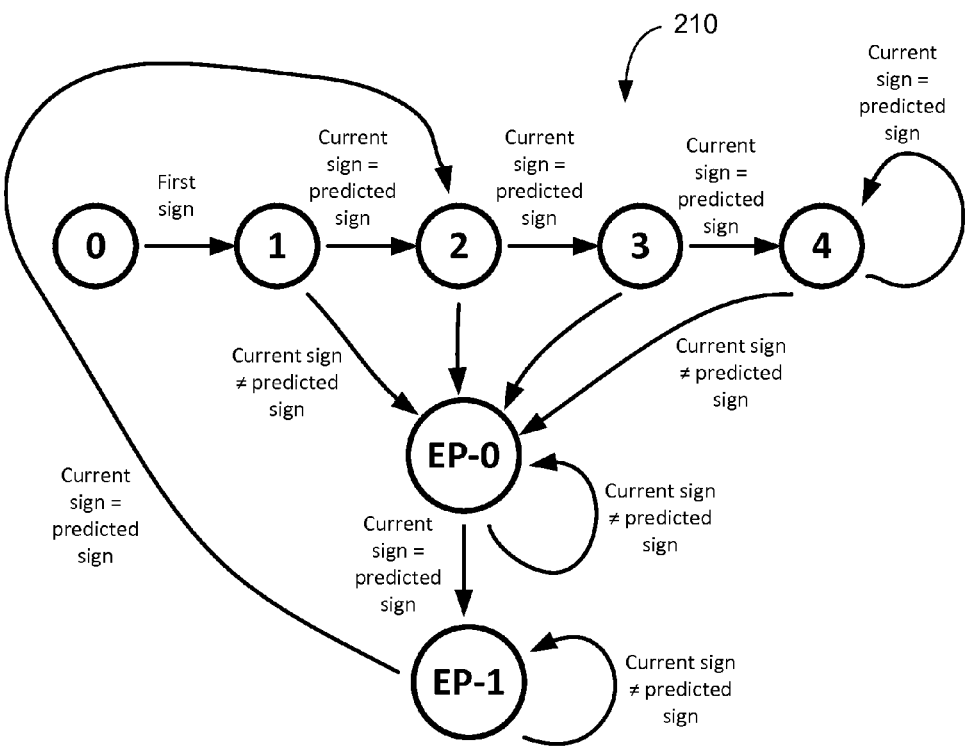
FIG. 5b shows another example finite state machine for determining context for coding sign flags of a block with transform skipped.

Another example finite state machine 210 is shown in FIG. 5b. This example finite state machine 210 does not revert to a first or initial state if a run of same signs is broken, but rather uses an intermediate state that corresponds to EP or bypass coding and from which it may be possible to transition back to context-based coding if a sufficient number of consecutive same signs are encountered again. This may be applicable in the case of larger blocks, particularly those involving intra-prediction where multiple runs of a common sign may be found.

In finite state machine 210, an initial transition is made from the first state to a second state which uses context-based coding, and from which the machine progresses either to further context-based coding states, like states 2, 3, and 4, or to an intermediate EP/bypass state that corresponds to non-context-based coding. Advancement to one or more further intermediate states (e.g. EP-1) may occur when a sign bit is encountered that matches the previous sign bit in the sequence and is again encoded using EP coding. Progression from a last intermediate state (in this example, EP-1) to one of the states that corresponds to context-based coding (i.e. states 1, 2, 3 or 4) may occur when a further sign bit is encountered that maintains the same sign. All subsequent sign bits are then encoded as per the current state value, as previously described. If at any point during the evaluation of the intermediate states a sign bit is encountered that does not match the previous sign bit in the sequence, the finite state machine then transitions back to the initial intermediate state. Other embodiments may have more or fewer intermediate states.

In a further embodiment, rather than encoding the sign bits themselves, another sign information syntax element may be coded. For example, the sign bit may be predicted based on one or more previously-coded sign bits and the syntax element that signals the sign bit may signal whether the prediction is true or not. As an example, the syntax element "is NotPredSign" may be used to indicate whether the prediction is accurate or not. In one example embodiment, the prediction is based on the immediately preceding sign bit that was coded.

In this example embodiment, the transitions from states 1 to 2, 2 to 3, and 3 to 4 are based on the current sign being equal to the predicted sign (e.g. the previously-coded sign), i.e. that every sign in the sequence has the same sign thus far. The transition back to state 0 is based on the current sign not being equal to the predicted sign.

Figure 6:
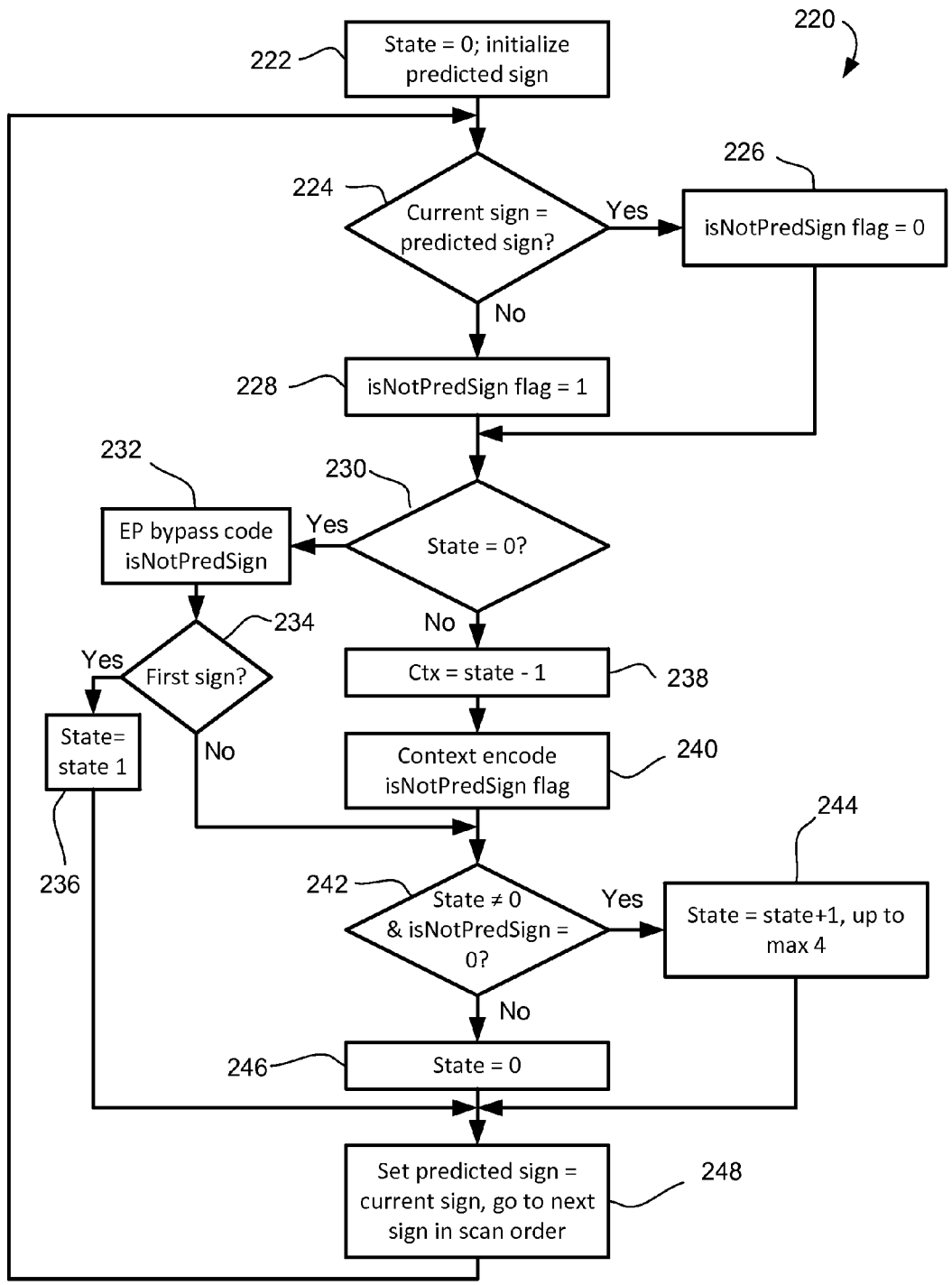
FIG. 6 shows an example method of context encoding sign information based on the finite state machine.

Reference is now made to FIG. 6, which shows, in flowchart form, an example method 220 for encoding sign information for the non-zero coefficients of a transform skipping block in a video encoder. The method 220 begins in operation 222 within initialization of the state index to state 0 and the setting of predSign to a designated initial value (which may be 0 or 1, depending on the convention and whether positive or negative is deemed the initial assumption). The encoder evaluates whether the current sign is the same as the predicted sign in operation 224. If so, then the is NotPredSign flag is set to zero in operation 226. It is set to 1 in operation 228 if the current sign is not the same as the predicted sign.

In operation 230 the encoder evaluates whether the machine is currently in state 0. If so, then the in NotPredSign is bypass encoded (non-context-based encoding) in operation 232. State 0 is handled differently when it is the first sign versus when the machine has returned to state 0 later in the sequence. Specifically, after the first sign the machine automatically moves to state 1 from state 0, whereas if the machine returns to state 0 later in the sequence it does not leave state 0. Accordingly, in operation 234 the encoder evaluates whether the just-encoded sign is the first sign in the sequence. If so, then in operation 236 the state index is advanced to state 1. Otherwise, the state index remains at state 0.

If, in operation 230, the encoder recognizes that it is not in state 0, then it determines a context for encoding the sign. In this embodiment, the context index is given by the state index less 1, as shown in operation 238. That is, state 1 corresponds to context 0, state 2 corresponds to context 1, and so on. The is NotPredSign flag is then encoded using context-based encoding and the determined context in operation 240.

After encoding of the is NotPredSign flag, the encoder then, in operation 242, assesses whether it is not in state zero (i.e. state index≠0) and is NotPredSign is zero (i.e. the current sign is the same as the previous/predicted sign). If both those conditions are met, then in operation 244, the state index is incremented by 1, up to a maximum, which in this example is four. If either or both of those conditions are not met, then the state is reset to zero in operation 246. It will remain in zero for the encoding the rest of the block. In operation 248, the predicted sign is set to the current sign, and the encoder moves to encode the next sign (or, more accurately, the in NotPredSign corresponding to the next sign). If no more signs remain to be encoded in the block, then the method 220 ends.

Figure 7:
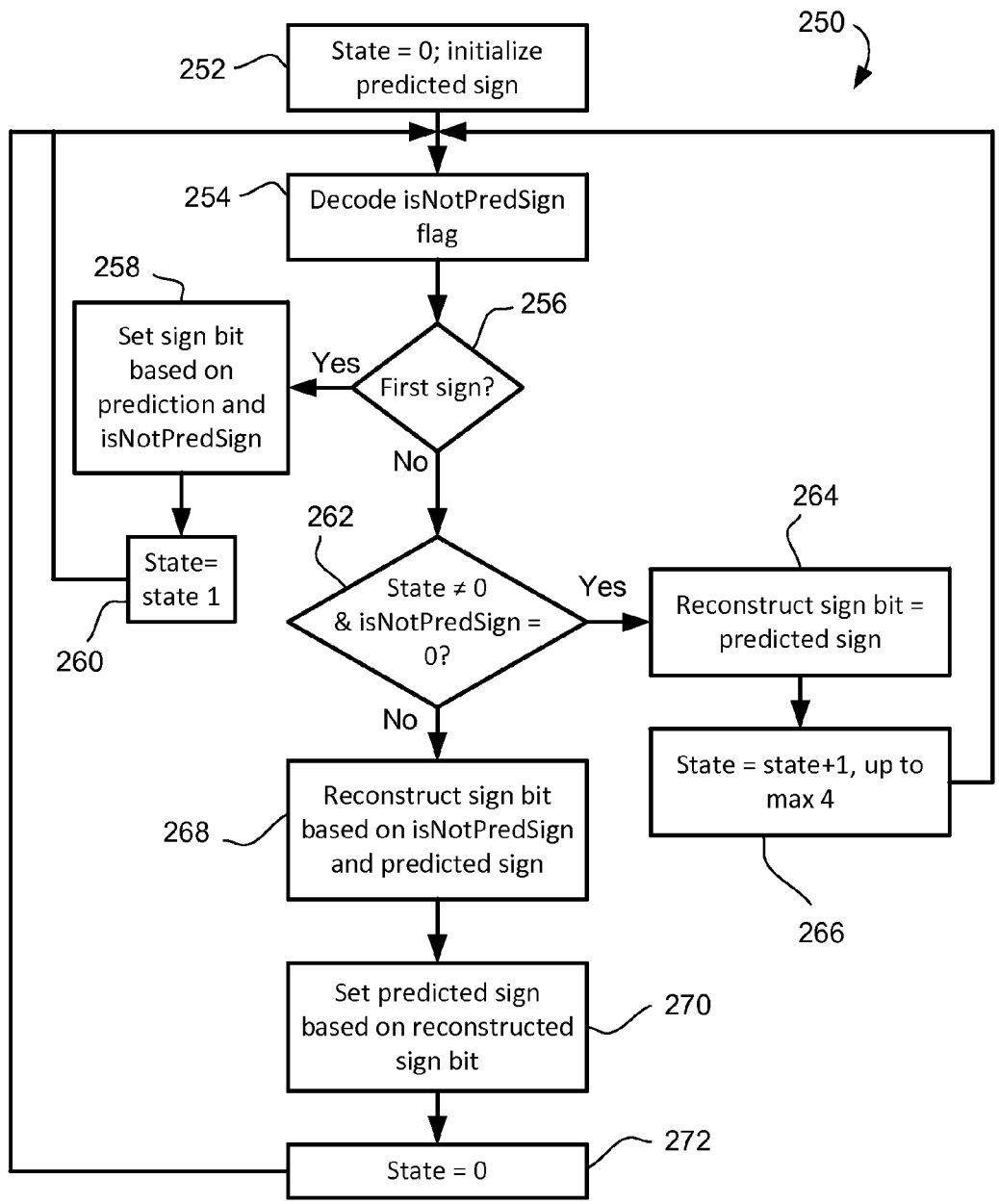
FIG. 7 shows an example method of context decoding sign information based on the finite state machine.

A corresponding example decoding method 250 is now illustrated with reference to FIG. 7, which shows a flowchart for the example decoding method 250. As with the previously-described methods, the decoding method 250 is conditional upon the block being a transform skipping block. The method 250 begins in operation 252 with initialization of the state index to zero and the predSign value (predicted sign) to an initial value. The initial value may be signaled to the decoder in header information, such as in the sequence header or elsewhere in the bitstream. In some instances, the initial value of predSign may be based on the last decoded sign, or on a default setting, or on some other element known to both the encoder and decoder.

The decoder begins by decoding the is NotPredSign from the bitstream in operation 254. The nature of the decoding depends on the state index. If the state index is zero, such as when decoding the first sign in scan order within a block, then the decoding is non-context-based decoding. If the state index is not zero, then the decoding is context-based decoding, where the context is determined based on the state index.

Once the is NotPredSign flag has been decoded, the decoder deals with the special handling of the first sign, as indicated by operation 256. If this is the first sign in the scan order in the block, then in operation 258 the first sign bit is set based on the decoded is NotPredFlag and the predSign value. That is if the is NotPredSign is zero, i.e. the sign is the same as the prediction, then the sign bit is set equal to the predSign value. Otherwise, it is set to the opposite of the predSign value. The state index is then automatically incremented to state 1 in operation 260. The method 250 then returns to operation to decode the next sign.

If this is not the first sign, as determined in operation 256, then the decoder assesses whether the state is not zero and whether the decoded is NotPredSign flag is zero in operation 262. These conditions test whether the machine is in a non-zero state and whether the currently-decoded sign is the same as the predicted sign. If so, then in operation 264 the sign bit is reconstructed as equal to the predSign value, and in operation 266 the state index is incremented up by one, subject to a maximum (in this case, 4). Note that in this situation we need not update the predSign value since it is the same as the sign bit just reconstructed. The method 250 then returns to operation 254 to decode the next is NotPredSign flag using the context corresponding to the incremented state index.

If, in operation 262, either the state is zero or the is NotPredFlag is 1, then the current sign bit is reconstructed based on the is NotPredSign flag and the predSign value in operation 268. If the is NotPredSign flag is 1, then the sign bit is reconstructed as the opposite of the predSign value, and if the is NotPredSign flag is 0, then the sign bit is reconstructed as the same as the predSign value. Then in operation 270 the predSign value is set equal to the reconstructed sign bit and, in operation 272, the state index is set to zero. The method 250 then returns to operation 254 to decode the next is NotPredSign flag using non-context-based coding.

It will be appreciated that in some embodiments, the same-sign flag may be used in conjunction with the finite state machine context-based coding process.

Context Determination Based on Previously-Coded Flags

In yet another aspect, sign bits in transform skipping blocks may be encoded and decoded using context-based coding, where the context is based upon the values of neighbouring or previously-coded sign bits. In another example, the two or more neighbouring or previously-coded coefficients may be used to determined context for sign coding.

As an example embodiment, the two neighbouring coefficients may be the coefficient below the current coefficient and the coefficient to the right of the current coefficient. The current coefficient may be denoted X and the two neighbours denoted A and B, as shown here:

X A
B

The sign of a coefficient may be expressed as follows:

$$\text{sgn}(x) = \begin{cases} 1, & \text{if } x > 0 \\ 0, & \text{if } x = 0 \\ -1, & \text{if } x < 0 \end{cases}$$

The following observations may be made regarding the sign of X:
  sgn(A)+sgn(B)>0: the dominant sign of A and B is positive, and X is more likely to be positive
  sgn(A)+sgn(B)<0: the dominant sign of A and B is negative, and X is more likely to be negative
  sgn(A)+sgn(B)=0: no dominant sign for A and B, and the sign of X is likely to be equiprobable In a case where sgn(A)+sgn(B)=0, no preference is given for the sign of X, which may be bypass coded, i.e., 1 bit per sign flag. In a case where sgn(A)+sgn(B) !=0, context-based coding may be used, and an example model for the sign of X is given by:

$$\text{ctxInc}(\text{sign of } X) = \begin{cases} 0, & \text{if } \text{sgn}(A) + \text{sgn}(B) == -2 \\ 1, & \text{if } \text{sgn}(A) + \text{sgn}(B) == 1 \\ 2, & \text{if } \text{sgn}(A) + \text{sgn}(B) == -1 \\ 3, & \text{if } \text{sgn}(A) + \text{sgn}(B) == 2 \end{cases}$$

In one embodiment, the context may be derived using the following expression:

$$\text{ctxInc}(\text{sign of } X) = \text{sgn}(A) + \text{sgn}(B) > 0 ? 2*(\text{sgn}(A) + \text{sgn}(B)) - 1 : 2*(\text{sgn}(A) + \text{sgn}(B) + 2)$$

Note that this is but one example of deriving the context for coding the sign of a coefficient based on prior-coded signs, where A and B are the two nearest spatial neighbors of X. In another example, A and B may be two prior-coded coefficients in the reverse scan order (or, more generally, the coefficient decoding order) before X. In yet another example, the signs of more than two neighboring coefficients may be used in the context derivation.

Predictions Based on Neighbouring Coefficients

As noted above, an is NotPredSign flag may be coded instead of the sign bits themselves to signal whether the sign bit matches a prediction. In the above-described embodiments, the prediction was based on the previously-coded sign. In another aspect, the prediction may be based on the sign and magnitude of neighbouring coefficients, such as, e.g., A+B>0. In one example, the neighbouring coefficients may include the right neighbour and the below neighbour in the transform skipping block. In one example, the predicted sign, predSign, may be defined as:
  predSign=0, if sgn(A)+sgn(B)>=0
         1, if sgn(A)+sgn(B)<0
In another example, the predSign is defined as:
  predSign=0, if sgn(A)+sgn(B)>0
         1, if sgn(A)+sgn(B)<=0

As noted, in other embodiments, the prediction may be based on more than two neighbouring coefficients, or may be based on two or more previously-coded coefficients in the scan order within the block. In yet a further embodiment, the prediction may be based on previously coded sign values in the scan order, i.e. only taking into account non-zero coefficients.

The flag is NotPredSign may be context coded. The context may use the same model described above in connection with sign bits. That is, the context model may be given by:

$$\text{ctxInc}(\text{isNotPredSign}) = \begin{cases} 0, & \text{if } \text{sgn}(A) + \text{sgn}(B) == -2 \\ 1, & \text{if } \text{sgn}(A) + \text{sgn}(B) == 1 \\ 2, & \text{if } \text{sgn}(A) + \text{sgn}(B) == -1 \\ 3, & \text{if } \text{sgn}(A) + \text{sgn}(B) == 2 \end{cases}$$

In the case of sgn(A)+sgn(B)=0, no preference is given for the is NotPredSign flag, which may be bypass coded, i.e. non-context-based coding. It is further observed that the probability Pr{X is negative|sgn(A)+sgn(B)=-a} is close to the probability Pr{X is positive|sgn(A)+sgn(B)=a}, where a=1, 2. This suggests that:

$$Pr\{\text{is NotPredSign}=0|sgn(A)+sgn(B)=-a\} \approx Pr\{\text{is NotPredSign}=0|sgn(A)+sgn(B)=a\}$$

Therefore, the conditions may be merged to reduce the number of contexts. In this case, when sgn(A)+sgn(B) !=0, an exemplary context model for coding is NotPredSign is given by:

$$ctxInc(\text{is NotPredSign})=abs(sgn(A)+sgn(B))-1$$

Figure 8:
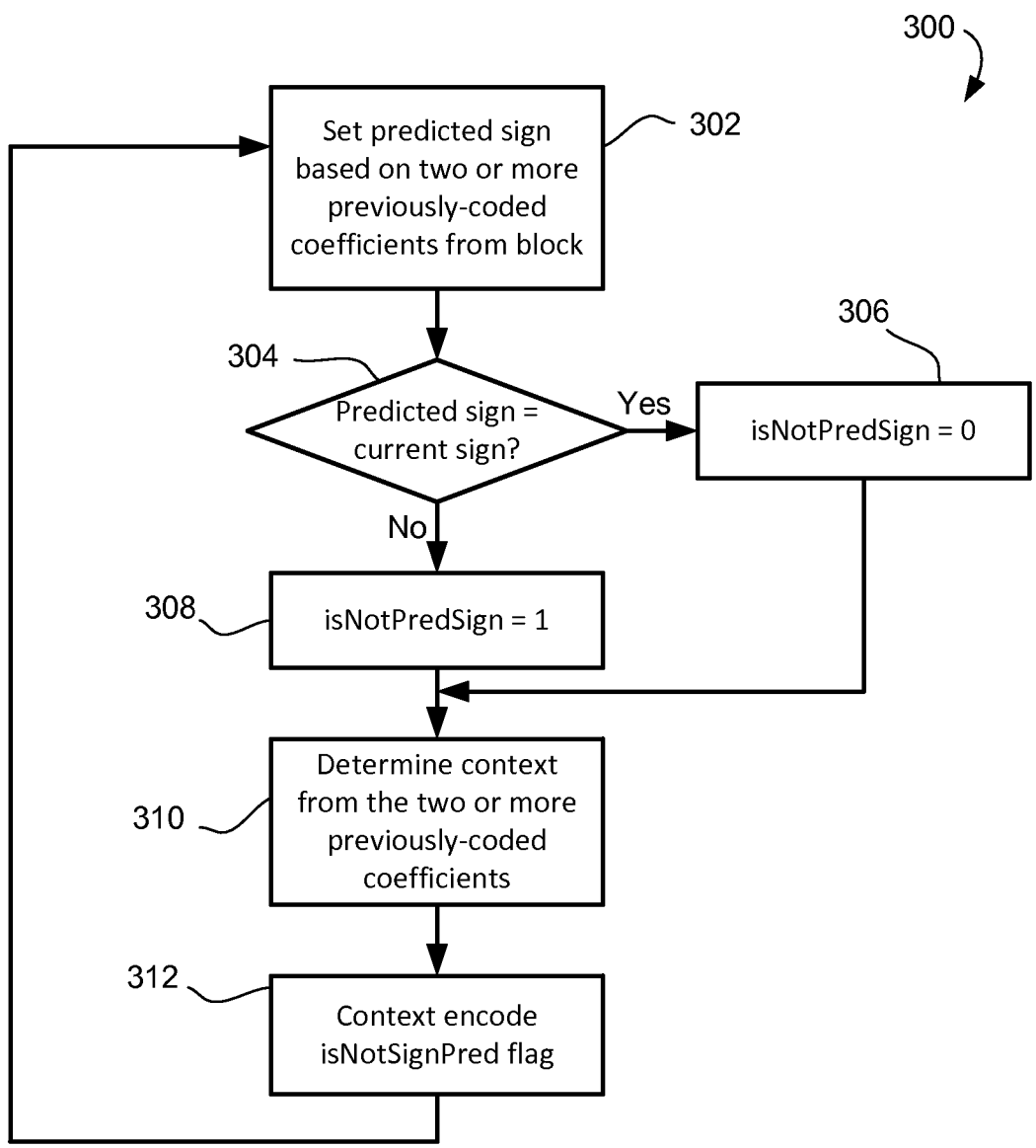
FIG. 8 shows an example method of encoding sign information for a block with transform skipped, using predictions and neighbouring coefficients.

Reference is now made to FIG. 8, which shows, in flowchart form, an example method 300 for encoding the signs of a transform skipping block in a video encoder. The method 300 begins in operation 302 with setting the predSign value based on the two or more previously-coded coefficients from the transform skipping block, as discussed above. Signs for coefficients in the bottom right portions of the block may have neighbours outside the boundaries of the block, in which case those neighbouring coefficients outside the boundaries of the block may be presumed to be zero.

In operation 304, the predSign value is compared to the current sign (currSign) and if they are the same, then the method 300 continues at operation 306 where the is NotPredSign flag is set to 0 to indicate that the sign matches the prediction. Otherwise, the is NotPredSign flag is set to 1 in operation 308. Afterwards, in operation 310 the context is determined from the two or more previously-coded coefficients from the transform skipping block. As noted above, the context may be based on abs(sgn(A)+sign(B))−1 in one embodiment. In other embodiments, more or fewer neighbours may be used to determine the context. The method 300 then returns to operation 302 if there are additional signs in the block to be encoded. Note that in some instances the operation 310 may include determining that the is NotPredSign flag should not be encoded using context-based coding, in which case non-context-based encoding is used in operation 312.

Figure 9:
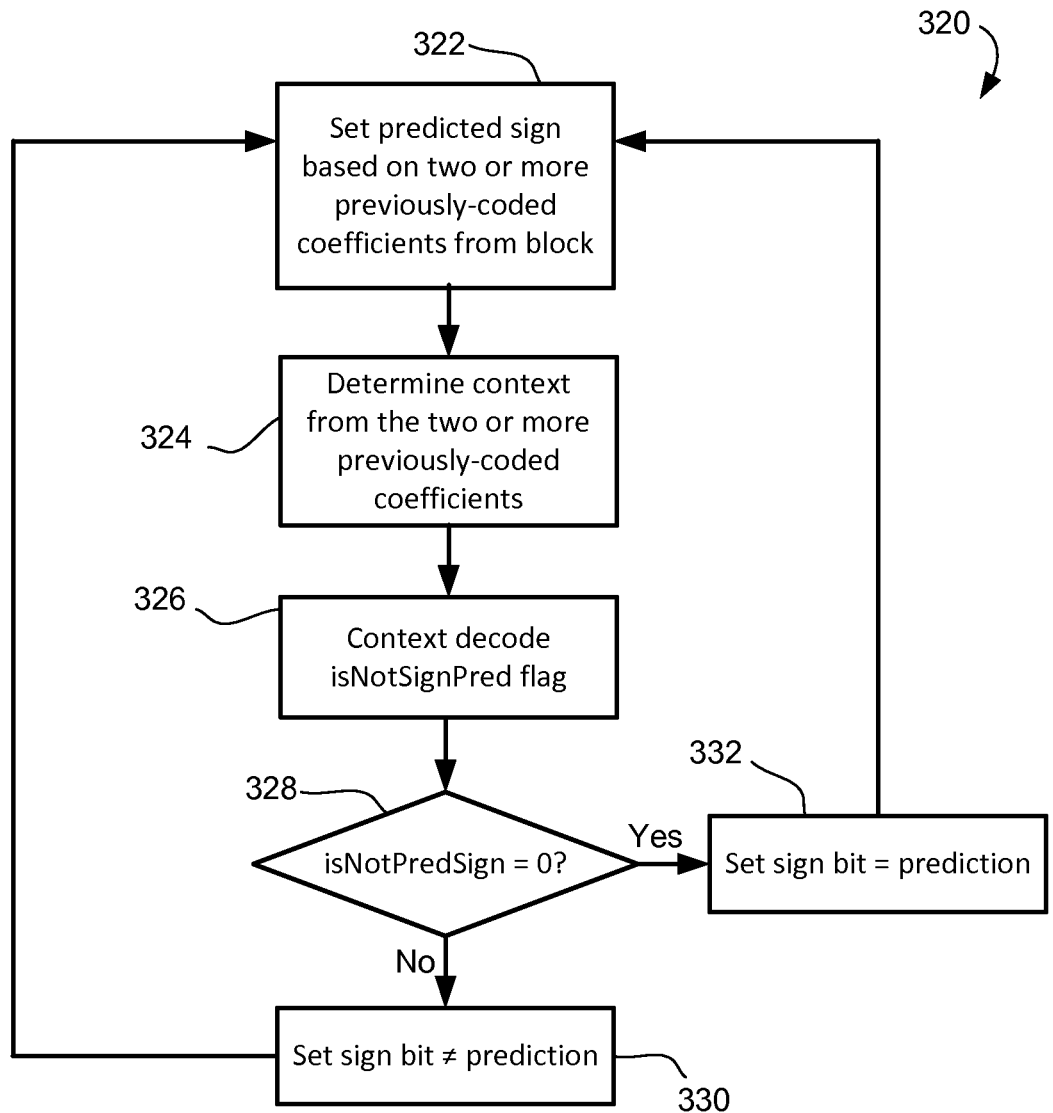
FIG. 9 shows an example method of decoding sign information for a block with transform skipped, based on predictions and neighbouring coefficients.

A corresponding example decoding method 320 for reconstructing sign bits in a video decoder is shown in flowchart form in FIG. 9. The method 320 includes setting a predSign value based on two or more previously-coded coefficients from the block in operation 322. Then, in operation 324, the context is determined from the two or more previously-coded coefficients from the block. Note that in some embodiments the coefficients used to determine context may be the same as the coefficients used to determine the predicted sign, and in some other embodiments, the coefficients used to determine context may be different from those used to predict the sign value.

Once the context has been determined, then in operation 326 the is NotPredSign flag is decoded from the bitstream of encoded video data. If the context determination results in EP bypass coding, then the is NotPredSign flag is decoded using non-context-based decoding. Otherwise, the determined context is used for context-based decoding of the is NotPredSign flag.

In operation 328, the decoder evaluates whether the decoded is NotPredSign flag is zero. If so, then the sign bit is reconstructed as having the same value as the predSign value, as indicated by operation 332. Otherwise, the sign bit is reconstructed as having the opposite value as the predSign value in operation 330.

Sign Flipping

In some instances, it can improve computational complexity and improve context adaptation to reduce the number of contexts being maintained and determined. In a further aspect, the sign coding for transform skipping blocks may use a single context. In conventional sign coding with transform blocks positive and negative signs occur with equal probability, meaning context-based coding does not enhance compression. Even with transform skipping blocks, over a number of transform skipping blocks positive and negative signs occur with equal probability, even though with individual transform skipping blocks there is a strong bias to one sign or another. Accordingly, the signs of individual blocks may be manipulated in order to ensure a bias is maintained in the sign distribution, so that context-based coding leads to better compression efficiency.

In one aspect, in order to maintain bias a dominant sign is designated and if a transform skipping block does not have a majority of dominant signs then all of the signs of that block are flipped. A flag is introduced for each transform skipping block to signal whether the signs have been flipped or not. The term "flipped" as used in the present application means that the sign has been inverted, i.e. positive-to-negative or negative-to-positive.

The sign flipping condition also allows for inferring signs in some instances. For example, if the dominant sign is positive and during encoding/decoding a near majority number of negative signs are encoded/decoded then it may be inferred that all the remaining signs must be positive so they need not be encoded/decoded.

The flag used for signalling whether a transform skipping block has had its signs flipped or not may be denoted a flipSign flag. It may be context encoded/decoded using a single dedicated context. The sign bits themselves may also be context encoded using a single dedicated context.

Figure 10:
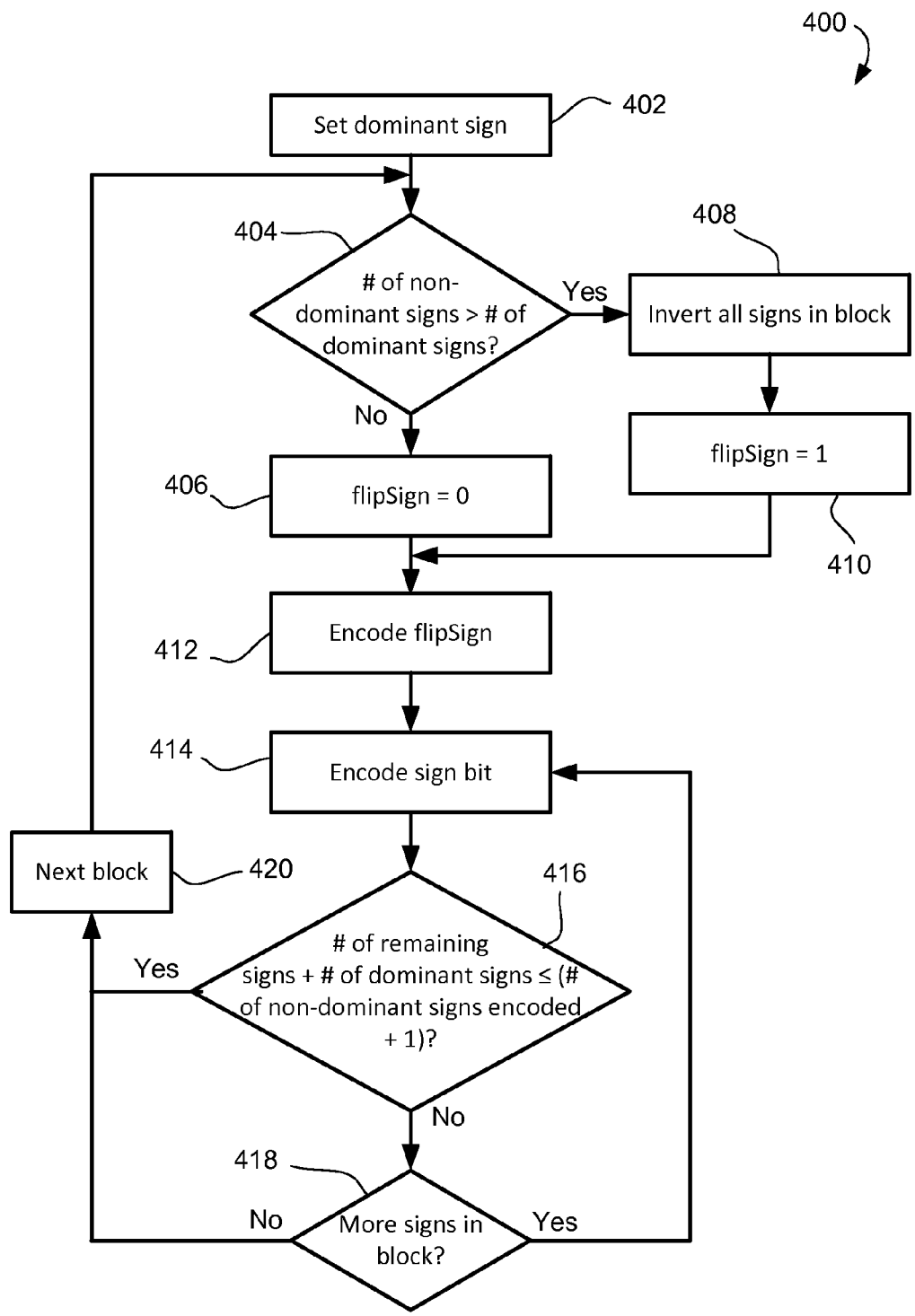
FIG. 10 shows an example method of context encoding sign bits for a block with transform skipped, using sign flipping.

Reference is now made to FIG. 10, which shows, in flowchart form, an example method 400 for encoding sign bits for a transform skipping block in a video encoder. The method 400 includes setting a dominant sign in operation 402. This may be signaled as a flag encoded in a sequence header, a picture header, or elsewhere in the bitstream. In some embodiments, it may be set by default in both the encoder and decoder. The dominant sign is set as either positive or negative and it indicates which sign is presumed to occur most often. In one embodiment, the dominant sign may be inferred based on other information in the bitstream. For example, the dominant sign may be based on the sign of the first non-zero coefficient in the picture, the majority sign of the first block (or set of blocks) in the picture, or any other such data from which a dominant sign may be selected.

In operation 404, for a transform skipping block, the encoder counts the number of positive signs and the number of negative signs. It then determines whether the number of non-dominant signs (whether positive or negative) is greater than the number of dominant signs. If so, then in operation 408, the encoder inverts all signs in the block. That is, it flips the signs such that all positive signs are negative and all negative signs are positive. In operation 410 the flipSign flag is set to 1 to signal that the signs are flipped. Operation 408 is shown here as a discrete sign flipping operation for ease of explanation, but, in practice, the flipping operation may not actually be implemented as a flipping of signs and then encoding them; rather, the flipping can be incorporated into the encoding step based on the flipSign flag.

If, in operation 404, it is determined that the number of non-dominant signs is fewer than or equal to the number of dominant signs, then in operation 406 the flipSign flag is set to zero.

In operation 412, the flipSign flag is encoded. The flipSign flag may be bypass encoded in some embodiments. In some embodiments, it may be encoded using context-based encoding. A dedicated context may be used in some embodiments.

The decoder then encodes the sign bits. In operation 414, it encodes the first sign bit in the scan order within the block. As discussed above, a dedicated context is used for coding the sign bit. In operation 416, it assesses whether the number of remaining signs to be encoded plus the number of dominant signs encoded is less than or equal to the number of non-dominant signs encoded plus one. In that case, the encoder knows that all remaining signs are dominant and it need not encode them. Otherwise, it proceeds to operation 418 where it assesses whether there are more signs in the block. If so, it returns to operation 414 to encode the next sign bit in scan order. If not, then in operation 420, the encoder moves on to the next block and (if it is a transform skipping block) returns to operation 404.

It will be understood from the foregoing description that flipping the signs of a transform skipping block to ensure a dominant sign remains the majority sign in the block is a way of ensuring bias in the occurrence of sign bits so that context encoding/decoding improves compression efficiency. Another way it may be understood is that the "flipSign" flag may be considered a flag indicating which sign is dominant in each corresponding transform skipping block. The context used for coding is then adapted to whichever sign is dominant for that block.

Yet another way of approaching this single-context sign bit coding aspect is that, rather than inverting the signs themselves and coding them, the MPS (most probable symbol) associated with the context may be inverted and used to code the signs as they are. The flipSign flag then signals whether to flip the MPS associated with the context. Note that using a dedicated context is but one example for context-based coding of the sign bits. In another example, more than one context may be used. In that example, the flipSign flag then signals whether to flip the MPS associated with each context.

Figure 11:
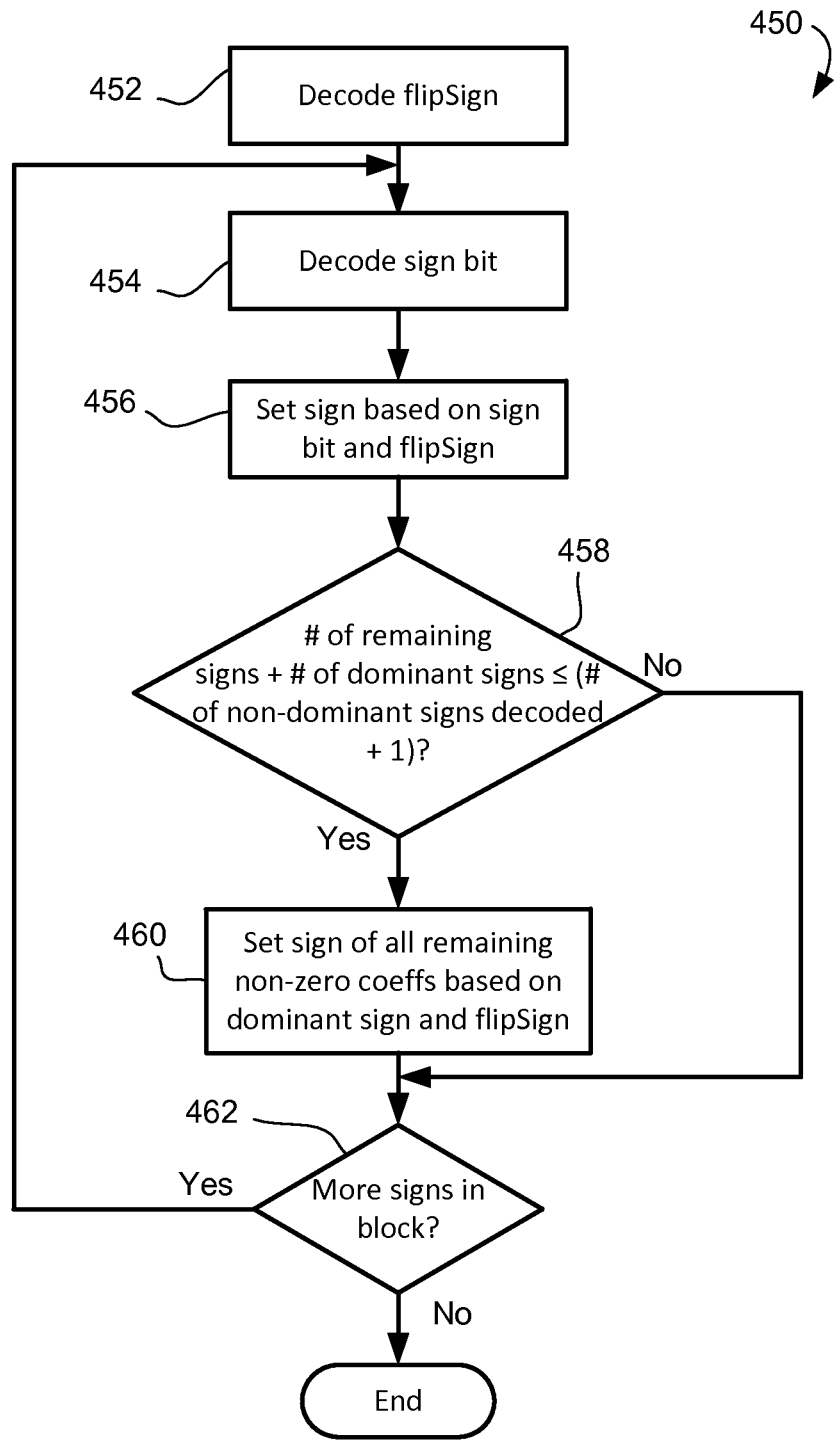
FIG. 11 shows an example method of context decoding sign bits for a block with transform skipped, using sign flipping.

Reference is now made to FIG. 11, which shows an example method 450 of reconstructing sign bits for transform skipping blocks of a video in a video decoder. The method 450 includes decoding the flipSign flag from the bitstream for a transform skipping block. The decoder then decodes a sign bit from the bitstream in operation 454. Sign bits are decoded in scan order within the block. The decoding is context-based, using the single dedicated context for sign bit coding.

In operation 456, the decoder reconstructs the sign bit for the non-zero coefficient in that position in the scan order based upon the decoded sign bit and the decoded flipSign flag. In operation 458, the decoder assesses whether the number of remaining sign bits for the block plus the number of decoded dominant signs is less than or equal to the number of decoded non-dominant signs plus one. If so, then the remainder of the signs may be presumed to be dominant signs, and the signs of all remaining non-zero coefficients are then set based on the dominant sign and the decoded flipSign flag, as indicated by operation 460. That is if the flipSign flag is zero, then the sign bit is set equal to the dominant sign. Otherwise, it is set to the non-dominant sign. In either case, in operation 462 the decoder next determines whether there are more signs to be decoded for the block. If so, it returns to operation 454 to decode the next sign bit.

Figure 12:
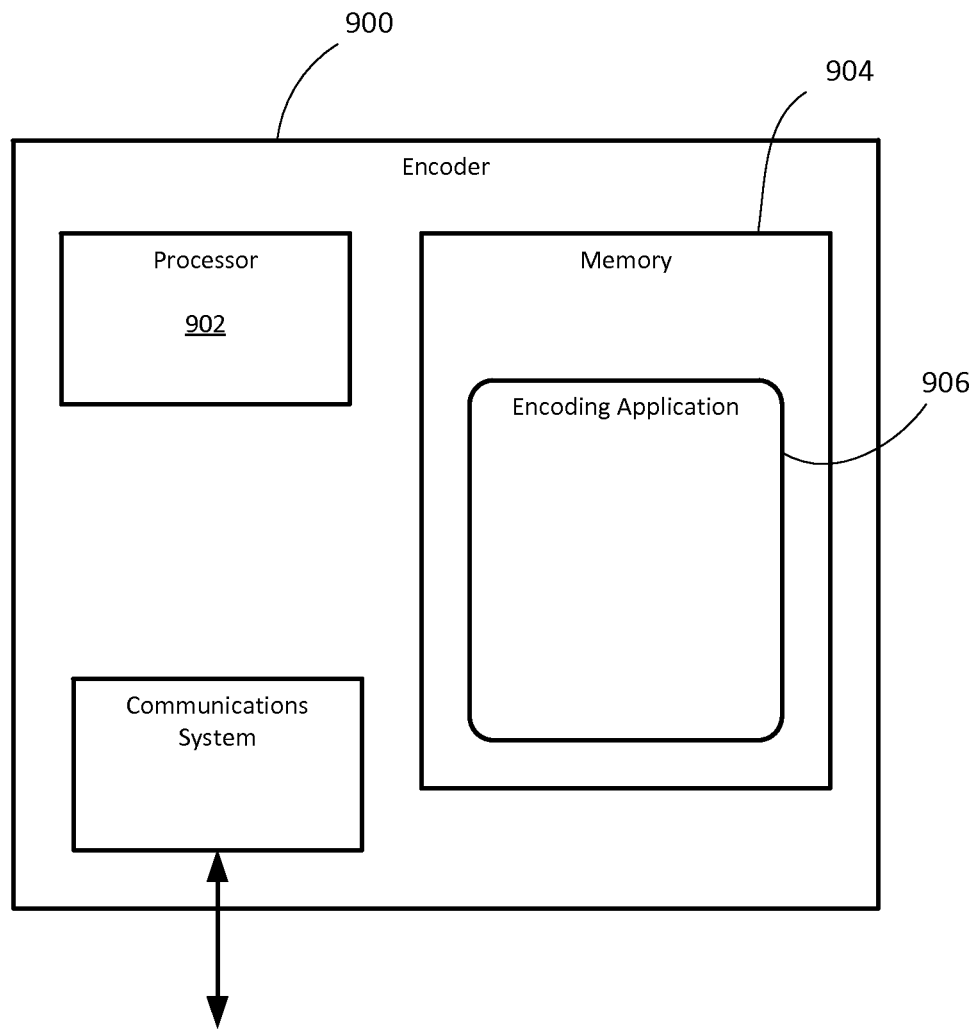
FIG. 12 shows a simplified block diagram of an example embodiment of an encoder.

Reference is now made to FIG. 12, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 13:
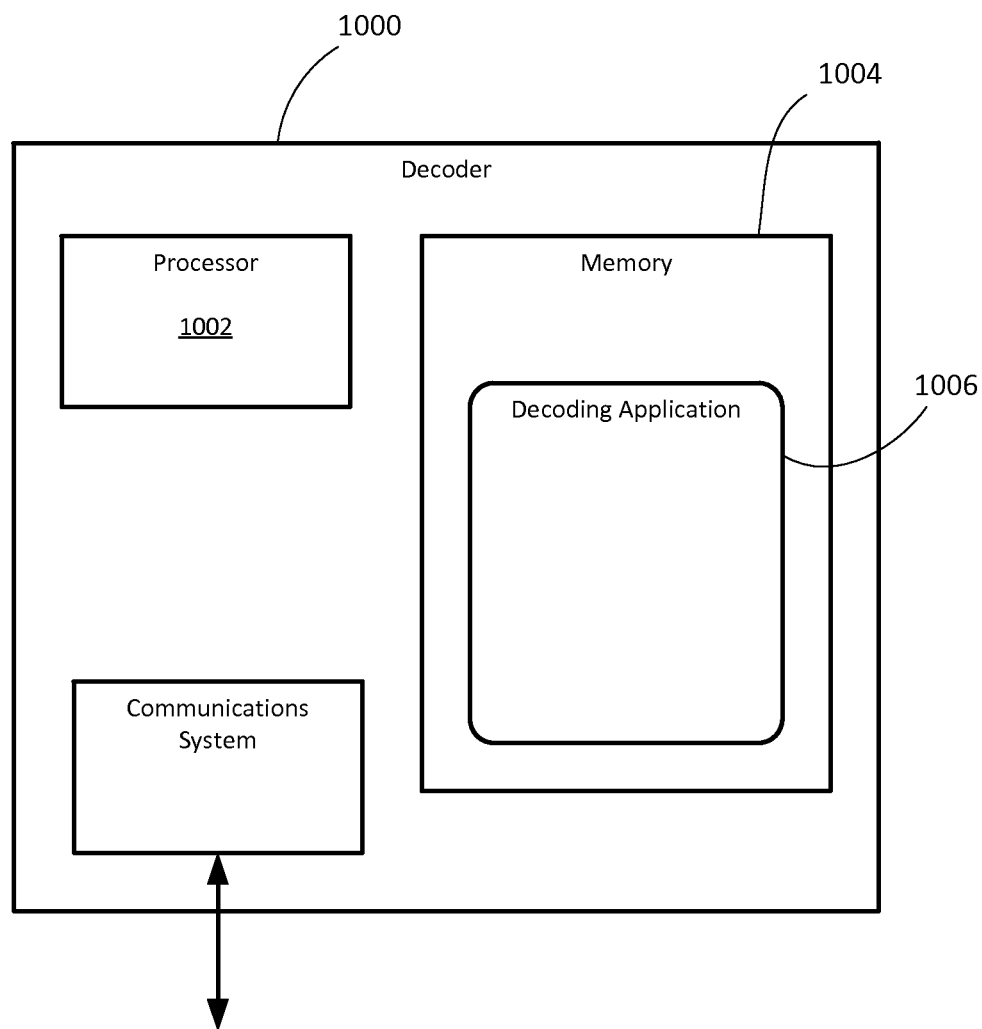
FIG. 13 shows a simplified block diagram of an example embodiment of a decoder.

Reference is now also made to FIG. 13, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. It will be understood that the decoding application 1006 may be stored in on a computer readable medium, such as a compact disc, flash memory device, random access memory, hard drive, etc.

It will be appreciated that the decoder and/or encoder according to the present disclosure may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present disclosure is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding a bitstream of data in a video decoder to reconstruct non-zero coefficients of a block in a video, the method comprising:
   determining that the block was encoded with transform skipped and, based on that determination,
      decoding a same-sign flag that indicates whether the non-zero coefficients in the block all have the same sign;
      if the non-zero coefficients all have a common sign, then
         decoding a syntax element that indicates whether the common sign is positive or negative, and
         reconstructing the signed values of the non-zero coefficients based on the syntax element; and
      otherwise, then
         reconstructing sign bits for the respective non-zero coefficients of the block, and reconstructing the signed value of each non-zero coefficient based on its respective sign bit.

2. The method claimed in claim 1, reconstructing sign bits includes decoding at least one sign bit from the bitstream.

3. The method claimed in claim 2, wherein reconstructing sign bits further includes inferring at least one sign bit without decoding it from the bitstream.

4. The method claimed in claim 2, wherein the decoding of at least one sign bit is non-context-based decoding.

5. The method claimed in claim 1, wherein the syntax element comprises a dedicated flag for signaling the common sign of all non-zero coefficients in a block with transformskipped, when the sign of each of the non-zero coefficients is the same.

6. The method claimed in claim 1, wherein the syntax element comprises a sign bit for one of the non-zero coefficients.

7. The method claimed in claim 6, wherein the syntax element comprises the sign bit for the first of the non-zero coefficients in a scan order within the block with transform-skipped.

8. The method claimed in claim 1, wherein determining that the block was encoded with transform skipped comprises decoding a transform skipping flag associated with the block.

9. The method claimed in claim 1, wherein the same-sign flag indicates that all the non-zero coefficients except for one coefficient have the common sign, and wherein reconstructing the signed values comprises reconstructing the signed values of the non-zero coefficients except for one coefficient, and inferring the sign of said one coefficient using sign-data hiding.

10. The method claimed in claim 1, wherein reconstructing the syntax element comprises inferring the value of the syntax element using sign-data hiding.

11. The method claimed in claim 1, wherein reconstructing the same-sign flag comprises inferring the same-sign flag based on a count of the number of non-zero coefficients in the block with transform skipped and a threshold.

12. A decoder for decoding a bitstream of data to reconstruct non-zero coefficients of a block in a video, the decoder comprising:
a processor;
a memory; and
a decoding application stored in memory and containing instructions for configuring the processor to perform the method claimed in claim 1.

13. A non-transitory processor-readable medium storing processor-executable instructions which, when executed, configure one or more processors to perform the method claimed in claim 1.

14. A method of encoding a block of video in a video encoder, the block having one or more non-zero coefficients, the method comprising:
determining that the block is to be encoded with transform skipped and, based on that determination,
encoding a same-sign flag that indicates whether the non-zero coefficients in the block all have a common sign;
if the non-zero coefficients all have the common sign, then encoding a syntax element that indicates whether the common sign is positive or negative; and
if the non-zero coefficients do not all have the common sign, then, for each of the non-zero coefficients, encoding a sign bit if its sign bit cannot be inferred.

15. The method claimed in claim 14, wherein the syntax element comprises a dedicated flag for signaling the common sign of all non-zero coefficients in a block with transform skipped.

16. The method claimed in claim 14, wherein the same-sign flag indicates whether all the non-zero coefficients except for one coefficient have the common sign, and wherein the sign of said one coefficient is encoded using sign-data hiding.

17. The method claimed in claim 16, wherein the syntax element comprises the sign bit for the first of the non-zero coefficients in a scan order within the block with transform skipped.

18. The method claimed in claim 14, wherein encoding the syntax element comprises encoding the value of the syntax element using sign-data hiding.

19. An encoder for encoding a block of video in a video encoder, the block having one or more non-zero coefficients, the encoder comprising:
a processor;
a memory; and
an encoding application stored in memory and containing instructions for configuring the processor to perform the method claimed in claim 14.

20. A non-transitory processor-readable medium storing processor-executable instructions which, when executed, configure one or more processors to perform the method claimed in claim 14.

* * * * *